Oct. 5, 1971   W. W. STRIPLING ET AL   3,610,053
MULTIPLE JET PNEUMATIC PULSE DURATION MODULATION GYRO
Filed Feb. 25, 1970   2 Sheets-Sheet 1

William W. Stripling
David L. Jones,
INVENTORS

William W. Stripling
David L. Jones,
INVENTORS.

United States Patent Office 3,610,053
Patented Oct. 5, 1971

3,610,053
MULTIPLE JET PNEUMATIC PULSE DURATION MODULATION GYRO
William W. Stripling and David L. Jones, Huntsville, Ala., assignors to the United States of America as represented by the Secretary of the Army
Filed Feb. 25, 1970, Ser. No. 14,126
Int. Cl. G01c 19/28
U.S. Cl. 74—5.6                                7 Claims

ABSTRACT OF THE DISCLOSURE

A pulse duration modulation gyro system for sensing attitude deviations of a missile from a preselected trajectory. The gyro system includes a space oriented rotor that spins on a hydrostatic air bearing about the stator therefor. To provide the air bearing, a gas is introduced into a plenum chamber within the stator housing. The gas is dispersed through passages radiating from the chamber to the spherical surface of the stator, terminating adjacent the inner spherical surface of the rotor or spinning wheel. The exhaust of the air bearing is fed into a pickoff chamber within the rotor and exhausts air from a multiple of air ports spaced symmetrically around the circumference of the rotor at an angle to the rotor equator. Four evenly spaced pickoffs provide an output signal in response to gas escaping through the air ports, periodically impinging on the pickoff inputs. When the gyro is subjected to an input rate, the rotor and stator are changed in reference to each other, changing the number of ports rotating past each pickoff and thereby changing the period that the gas impinges on the pickoffs. Thus, a variable output signal indicating the direction of change in trajectory is provided.

BACKGROUND OF THE INVENTION

A directional gyro is a two-degree-of-freedom gyro including a rotating mass, rotor, that spins about a spin axis, and is stabilized in space. Motion of the rotor base or support structure about the quadrature axes does not disturb the spin (reference) axis. A pickoff is used to measure rotation of the support structure with respect to the rotor. In a missile, a directional gyro aligned with the spin axis along the missile longitudinal axis is used to provide attitude control of the missile. Pickoffs detect changes in the missile trajectory with respect to the isolated rotor and activate directional controls such a moveable fins or gas jet exhausts to return the missile to the desired trajectory.

In pickoffs that respond to air jets an air or gas supply is normally directed toward the pickoff. If an air bearing is also employed, the two sources and exhausts therefor are separate. Relative motion between the rotor and the stator (support srtucture) deflects the air stream on and off of the pickoff. The air bearing supply is exhausted directly from the bearing area to the outer atmosphere providing no further useful function. Additional pickoff methods include optical detection of the reflection of an optical signal from reflective areas of a spinning rotor. Attitude deviations result in a change of direction of the reflected light beam which is sensed by the detector.

SUMMARY OF THE INVENTION

The apparatus of the present invention is a device for providing attitude control of a missile. A free rotor, spinning wheel, provides pitch and yaw control of the missile. The momentum of the rotor is sufficiently high enough to minimize the effect of torques associated with the flow of controlling gas. The gyro is brought up to speed, uncaged at launch of the missile and maintains the missile on a trajectory normal to the plane of the spinning rotor. Exhaust gas is supplied to a plenum chamber within a stator housing about which the rotor spins. The plenum chamber has a plurality of passages extending radially therethrough and terminating at the spherical surface thereof. The terminting or distal end of each passageway is adjacent the inner surface of the rotor. Gases under pressure are evenly distributed through the passageways exiting at the stator surface to provide a hydrostatic bearing between the inner surface of the rotor and the outer spherical surface of the stator. The rotor bearing air is also the source of air for the gyro pickoff. The air bearing exhaust gas is fed into a pickoff chamber wherein gas is exhausted evenly through symmetrical air ports to the outer surface of the rotor. The air ports are spaced symmetrically around the circumference of the rotor at an angle with the equator of the rotor. Pickoff inputs are evenly spaced around the rotor equator and fixed with respect to the stator. When pitch or yaw variations occur in the missile the rotor and stator are changed in reference to each other. The pickoff collector receives exhausting gas in proportion to the deviation toward the particular collector or input. Thus, an output of the pickoff indicating the direction and mangitude of deviation is obtained and can be coupled to a bi-stable flueric amplifier for correction of the missile flight path.

An object of the present invention is to provide a multiple jet gyro having a single air source for providing a hydrostatic air bearing and a uniformly distributed air jjet exhaust for pickoff.

DESCRIPTION OF THE PREFERRED EMBODIMENT

Figure 2:
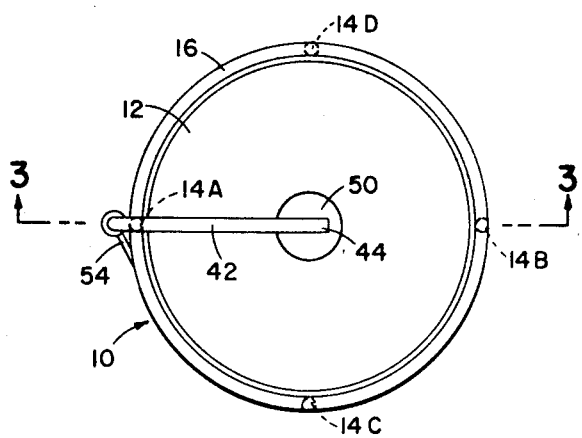
FIG. 2 is a plan view of FIG. 1 shown in reduced scale.
Figure 1:
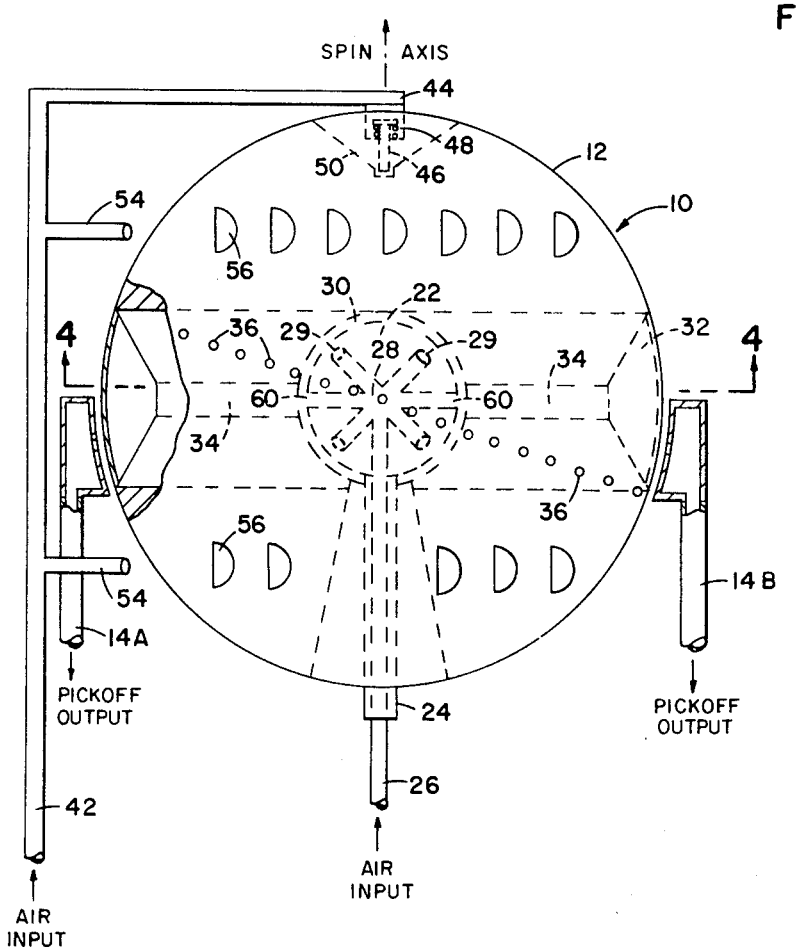
FIG. 1 is an elevational view of a preferred embodiment of the multiple jet gyro shown partially in section.

Referring now to the drawings wherein like numerals represent like parts in all figures, a preferred embodiment is disclosed in FIGS. 1 and 2. A pneumatic pulse duration modulation (PDM) gyro motor 10 includes a rotor structure 12 having 4 pickoffs 14 lying in quadrature axes around the equator of the gyro. A support ring 16 supports and aligns pickoffs 14 in the same plane. Rotor 12 is mounted for rotation about motor stator 22. Stator 22 is fixed to a support shaft 24 through which an air input passage 26 passes to supply air bearing and pickoff gas. Stator 22 is spherical, having a plenum chamber 28 in the center thereof for receiving input air or gas. At least eight (8) exhaust passages 29 connect plenum chamber 28 to the exterior surface of stator 22 for exhausting gas from chamber 28 to form a hydrostatic air bearing 30 between the outer surface of stator 22 and the inner spherical surface of rotor 12. Only four air passages 29 are shown in FIG. 1 for providing hydrostatic bearing exhaust. Four additional air passages 29 are behind those shown, with all passages forming 4 intersecting axes having 2 passages per axis.

Figure 4:
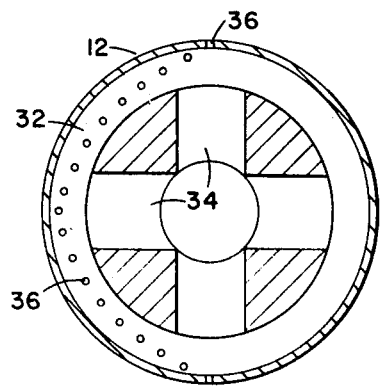
FIG. 4 is a view along the lines 4—4 of FIG. 1 shown in reduced scale.
Figure 3:
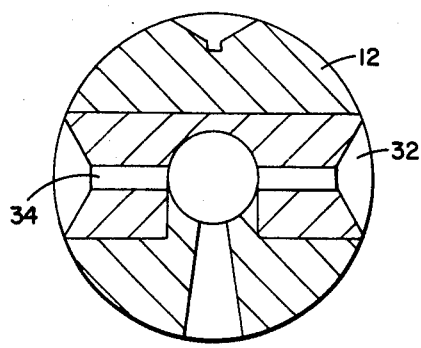
FIG. 3 is a view along the lines 3—3 of FIG. 2.

As shown in FIGS. 1, 3, and 4, rotor 12 has an annular pickoff chamber 32 beneath the exterior surface around the equator thereof. Pickoff chamber 32 is connected to the inner surface of rotor 12 by at least 4 input passages 34. Passages 34 are in the plane of pickoff chamber 32, and exhaust gas from hydrostatic bearing 30 passes through passages 34 to chamber 32. There is also a small amount of exhaust gas from bearing 30 that exits around shaft 24 where it intersects stator 22 preventing frictional contact between the shaft and rotor. The gas in pickoff chamber 32 is exhausted evenly to the exterior surface of rotor 12 through a plurality of air ports 36, jets spaced symmetrically around the circumference of the rotor. Air ports 36 are at an angle to the equator of the rotor while chamber 32 is centered about the equator of the rotor. Air exhaust ports 36 lie in a plane that is diagonal to annular pickoff chamber 32. Since the diagonal plane passes through the center of chamber 32 and rotor 12, only half of exhaust ports 36 are shown in FIG. 4.

A passageway forming member 42 supplies gas or air for spin up and caging of rotor 12. The distal end 44 of member 42 has an air piston 46 protruding therefrom. Piston 46 is spring loaded by spring 48 and projects into a tapered groove 50 of rotor 12 when air pressure is supplied to passageway member 42. After spin-up of the rotor, piston 48 is retracted from groove 50 by the spring action when air pressure is removed from member 42. Groove 50 and piston 46 are aligned along the spin axis of the rotor. Nozzles 54 connect to passage way member 42 and exhaust air tangentially to the surface of rotor 12. The air exhausted through nozzle 54 impinges on air cups or buckets 56 around the periphery of the rotor for rotor spin-up.

Figure 7:
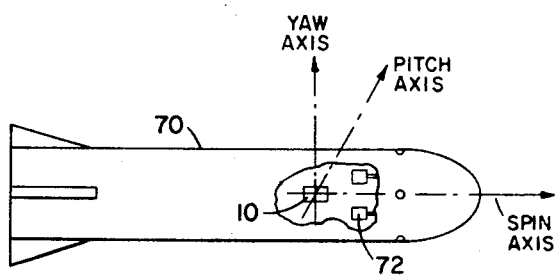
FIG. 7 is a diagrammatic view of a missile incorporating the invention therein.

The air bearing and pickoff air that is supplied at input passage 26 can be furnished from the same source that supplies spin-up and caging air to member 42, or the supplies may be separate. During spin up, piston 48 contains rotor 12 without bumping or dragging on the rotor due to gas exhausting uniformly around the piston and deflecting from tapered groove 50. Simultaneously, air introduced into plenum chamber 28 provides a hydrostatic air bearing 30. The exhaust from bearing 30 passes through input passages 34 to provide uniform pressure in pickoff chamber 32. After spin-up, air providing spin-up and caging is removed, uncaging rotor 12 which remains fixed in space, rotating about the spin axis. In a missile, as shown in FIG. 7, the spin axis is directed in the direction of trajectory, which may be along the longitudinal axis of missile 70. Pickoffs 14 are arranged along the pitch and yaw roll axes to sense attitude deviation of the missile with respect to the rotor. For this type of directional control the stator shaft 24 is fixed to the missile. Pickoffs 14A and 14B may be used, typically, to respond to rotation of the support structure (missile 70 or stator 22) about the yaw axis measuring missile yaw. Pickoffs 14C and 14D are then measuring pitch, rotation of the stator being about the pitch axis.

Figure 5:
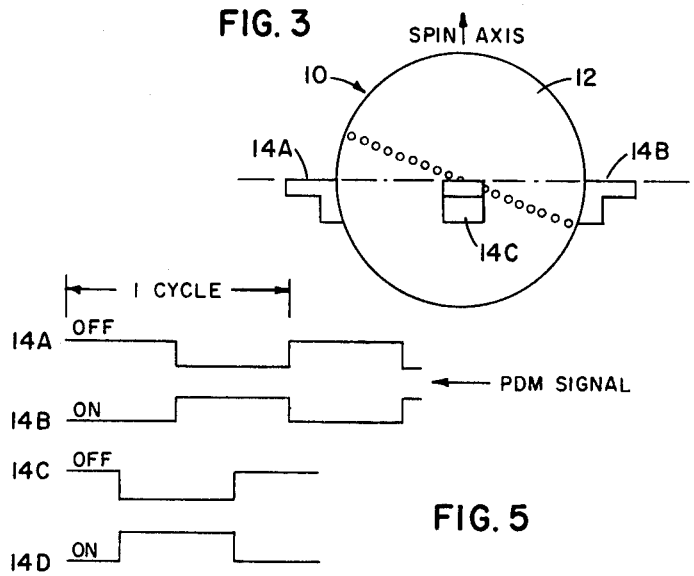
FIG. 5 shows the relative position of pickoff and air ports of a caged gyro.

In FIG. 5 the rotor 12 is shown with a balanced output respeciing the stator and pickoffs 14. This represents either a caged condition or no deviation from desired trajectory. The PDM output signal from each pickoff 14 is represented as being OFF or ON in conjunction with the absence or presence of exhaust air on the respective pickoff. The OFF–ON action from pickoffs 14C and 14D are separated by ¼ of a revolution of stator 12, or 90° from the OFF–ON action of pickoffs 14A and 14B. The pickoffs 14 are aligned with one edge of the collector or detector thereof along the rotor equator and the other edge at the lowest exhaust air port 36. Thus, input roll in one direction increases the period of the output signal, input roll in the opposite direction decreases the duration of the output signal for a particular pickoff 14. Thus, an ON-OFF or BANG-BANG control system is evidence where any angular difference of the missile longitudinal axis from the spin axis results in a constant rate of output for a variable time.

Figure 6:
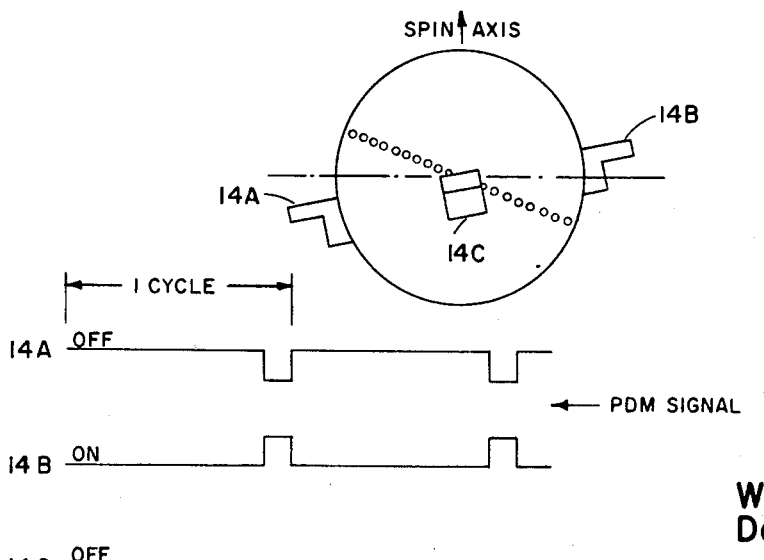
FIG. 6 shows a relative position of pickoff and air ports of an uncaged gyro subjected to pitch or yaw motion.

In FIG. 6 the stator is changed with reference to rotor 12 indicating a roll of the support structure, stator and pickoffs with respect to the spinning rotor. Movement is arbitrarily selected to be about the yaw axis indicating a roll or deviation of the missile and stator trajectory. Thus, the escaping pickoff air that impinges on pickoffs 14A and 14B is changed while the pickoff air on 14C and 14D remains the same. The outputs of pickoffs 14 can be coupled to missile directional control systems for correcting flight errors. In FIG. 7, the gyro pickoff gas is fed to a pair of bi-stable flueric amplifiers 72. One amplifier controls missile pitch in response to pickoff inputs of 14C and 14D, the other controls jaw deviation in response to inputs of 14A and 14B. Obviously missile drift in the direction of a particular quadrant formed by the pickoffs will bring about restoring action from all pickoffs.

The primary exhaust path of hydrostatic air bearing gas is through pickoff chamber 32 and air ports 36 to the respective pickoffs 14. The air pressure of pickoff chamber 32 is substantially less than the pressure required for hydrostatic bearing 30 and bearing exhaust through input passages 34 is sufficient to maintain a uniform output from ports 36. However, in the event increased pickoff chamber pressure is desired, stator 22 can include a pair of balanced exhaust passages 60 for increasing the gas supplied directly to chamber 32 from plenum chamber 28. Also, since equilibrium between stator and rotor is corrected or maintained at the beginning of a change in relative position, there is no frictional contact between shaft 24 and rotor 12.

We claim:

1. A multiple jet pneumatic pulse duration modulation gyro for displacement control comprising: a gyro motor having a rotor and a stator, said stator being inclosed by said rotor and providing support therefore; a plenum chamber within said stator having an input passage for receiving exhaust gas or air and having a plurality of output passages for conveying gas therethrough to the outer surface of said stator; said rotor having an inner surface adjacent said stator outer surface for providing a hydrostatic air bearing between said rotor and stator in response to gas being exhausted from said stator output passages; said rotor having a gas pickoff chamber therein, a plurality of rotor input passages connecting said chamber to said inner rotor surface for uniformly exhausting said hydrostatic bearing gas into said pickoff chamber, and a plurality of output pickoff ports for exhausting said pickoff chamber gas from the gyro motor; and pickoff and caging means adjacent the exterior surface of said rotor, said pickoff means being a plurality of tubular passageway forming members evenly spaced in a plane about the circumference of said rotor for receiving gas exhausted from said pickoff output ports.

2. A pulse duration modulation gyro as set forth in claim 1 wherein said caging means comprises a passageway forming member for passing gas therethrough and terminating with the distal end thereof adjacent said rotor and coaxial with the spin axis thereof, a symmetrically tapered notch in said rotor adjacent said distal end, and a spring loaded piston in the distal end of said passageway forming member for projecting into said rotor notch without contacting said rotor when gas pressure is supplied through said passageway forming member.

3. A pulse duration modulation gyro as set forth in claim 2 wherein said rotor pickoff output ports comprise a plurality of ports symmetrically spaced around the circumference of the rotor intercepting the equator of said rotor at an acute angle, said pickoff chamber is an annular chamber at the equator of said rotor adjacent the outer surface thereof, and said chamber input passages are 4 symmetrically spaced passages lying in the plane of said pickoff chamber.

4. A pulse duration modulation gyro as set forth in claim 3 wherein said pickoff chamber output ports lie in a plane diagonal to said annular pickoff chamber.

5. A pulse duration modulation gyro as set forth in claim 4 wherein said plurality of stator output passages comprise at least 8 passages symmetrically spaced about said plenum chamber and alternate passages being equidistantly spaced above and below the plane of said annular pickoff chamber.

6. A pulse duration modulation gyro as set forth in claim 5 and further comprising first and second series of air cups evenly spaced around the periphery of the rotor and spaced an equal distance on opposite sides of the rotor equator or pickoff chamber, first and second spin-up nozzles aligned respectively with said air cups and fixed to said caging passageway forming member for passing gas to said cups, thereby spinning up said rotor while caging said rotor.

7. A pulse duration modulation gyro as set forth in claim 6 wherein said stator further comprises at least 2 additional output passages symmetrically spaced about said plenum chamber in the plane of said rotor input passages for exhausting gas directly from said plenum chamber into said pickoff chamber.

References Cited

UNITED STATES PATENTS

| | | | |
|---|---|---|---|
| 2,729,106 | 1/1956 | Mathiesen | 74—5.7 |
| 3,115,784 | 12/1963 | Parker | 74—5.7 X |
| 3,276,270 | 10/1966 | Speen | 74—5.7 X |
| 3,320,816 | 5/1967 | Johnston | 74—5.6 |
| 3,362,234 | 1/1968 | Bickman | 74—5.6 |
| 3,416,378 | 12/1968 | Evans et al. | 74—5.43 X |
| 3,482,454 | 12/1969 | Speen et al. | 74—5 |

MANUEL A. ANTONAKAS, Primary Examiner

U.S. Cl. X.R.

74—5.43; 308—Dig. 1